May 8, 1928.
J. R. KUZMA ET AL
BUTTON BLANK MACHINE
Filed April 6, 1926
1,669,058
3 Sheets-Sheet 1
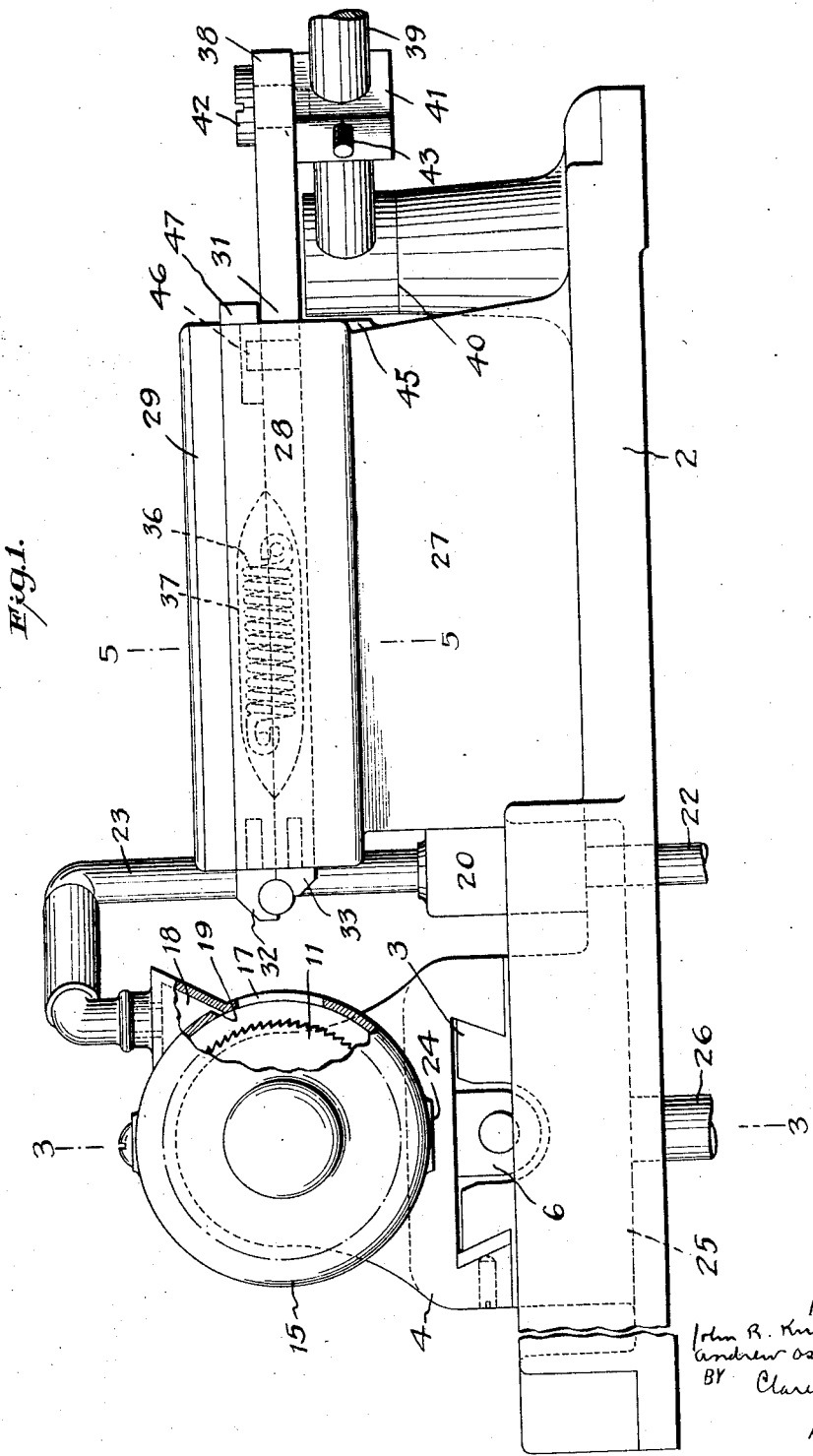
INVENTORS
John R. Kuzma
Andrew Ostrochovsky
BY
ATTORNEY

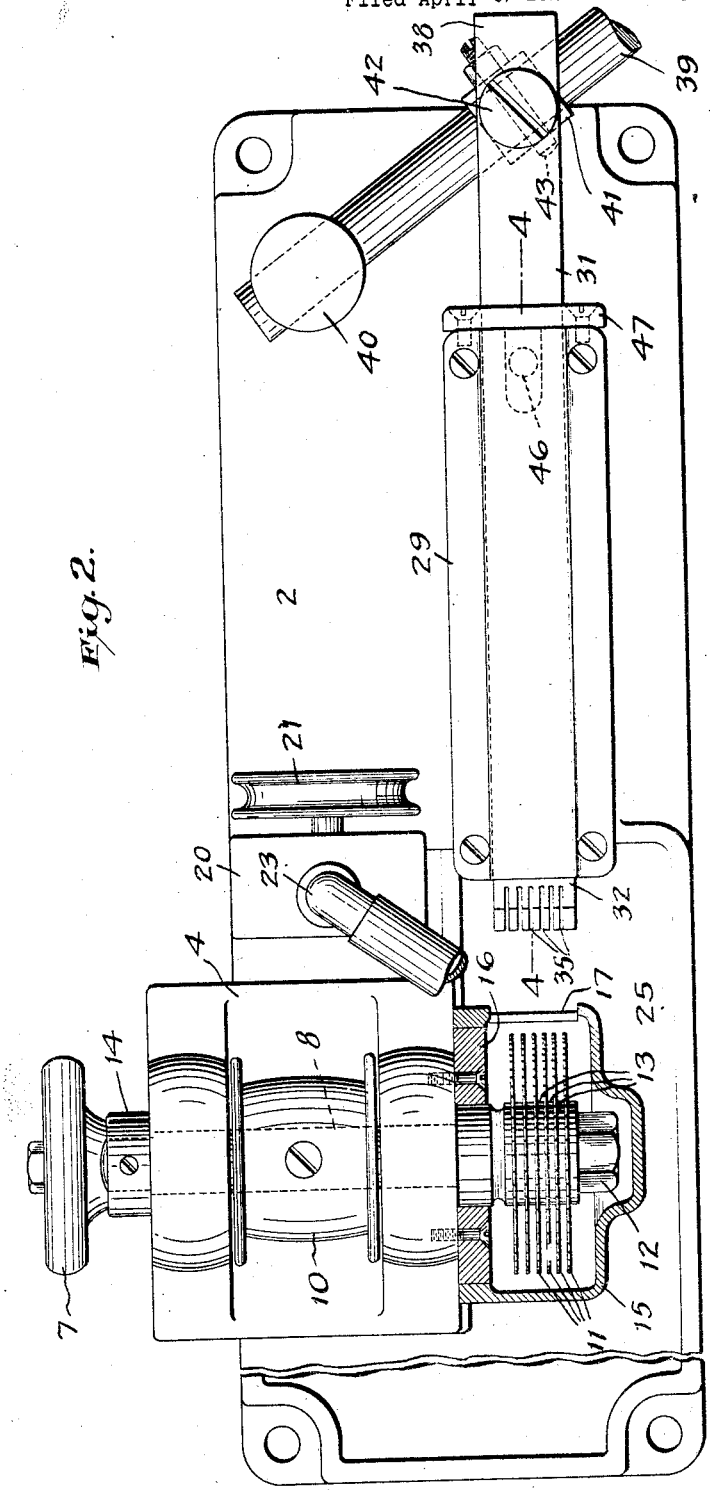

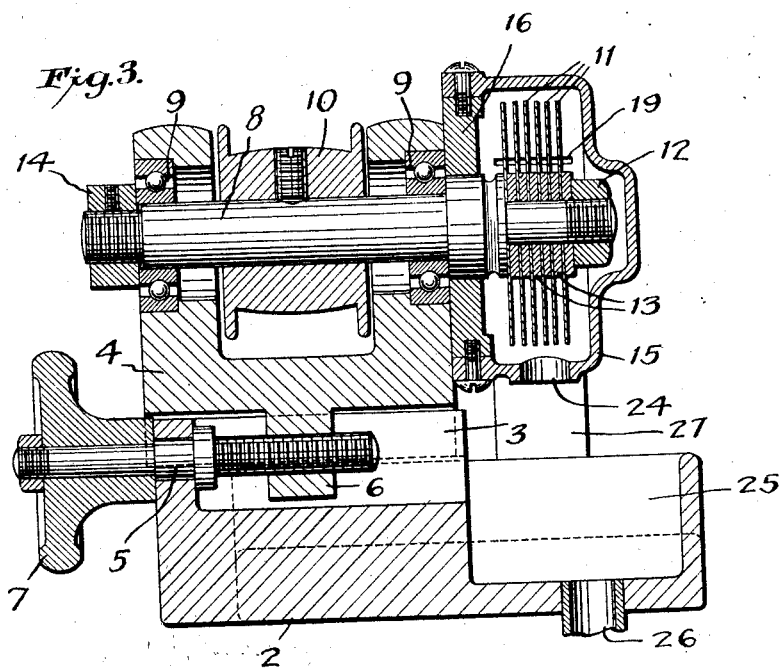
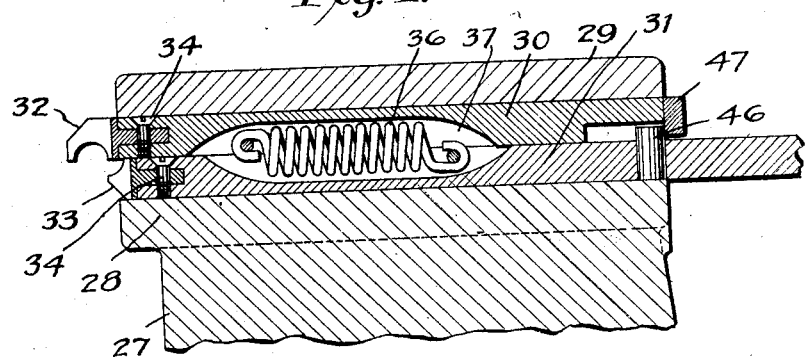
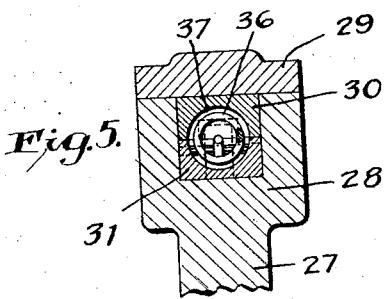

Patented May 8, 1928.

1,669,058

UNITED STATES PATENT OFFICE.

JOHN R. KUZMA AND ANDREW OSTROCHOVSKY, OF NEW YORK, N. Y., ASSIGNORS TO MANHATTAN BUTTON MACHINE CO. INC., OF NEW YORK, N. Y., A CORPORATION OF NEW YORK.

BUTTON-BLANK MACHINE.

Application filed April 6, 1926. Serial No. 100,010.

The invention relates particularly to a machine to be used by the mother-of-pearl button industry, and comprises a machine for splitting or cutting cores into button blanks, the cores in question being small cylinders cut from various kinds of shell.

In dividing these cores it has been the practice to split the cylinders into rough button blanks by hand, with a chisel. This results in the production of uneven blanks of all thicknesses, making it necessary to grind them to the desired thickness by means of another machine, which means waste of material and additional time, labor and expense.

The object of the present invention is to provide a simple and efficient machine with which to cut such cores or cylinders into a plurality of equal blanks at one operation, whereby more blanks may be obtained from one core, and the blanks are caused to be all of the same size, and straight and even, rendering unnecessary a grinding operation.

We are aware that complicated machines have been proposed for doing this work, and the particular purpose of our invention is to provide a very simple machine with which to perform the operation satisfactorily and accurately. The machine comprises a stationarily supported spindle carrying a gang of rotary saw discs, a slidable two-part chuck movable in right lines toward and from the cutters, with slotted jaws at its forward end adapted to hold the core, and single lever means for advancing and withdrawing the chuck and causing the opening and closing of its jaws. The construction and operation of this chuck is a feature of the machine.

The nature and advantages of the machine will be readily understood from the following specification.

In the accompanying drawings, forming part hereof:

Fig. 1 is a front elevation of the machine, a portion of the base being broken out because of limits of space, and a portion of a housing being shown broken away and in section, the handle portion of the hand lever being also broken away;

Fig. 2 is a plan view, the saw housing being shown in horizontal section, and a conduit being broken away;

Fig. 3 is a vertical, transverse section taken on the line 3—3 of Fig. 1;

Fig. 4 is a vertical, longitudinal section taken on the line 4—4 of Fig. 2; and

Fig. 5 is a vertical transverse section on the line 5—5 of Fig. 1.

The machine has an oblong base or frame 2, on which, toward one end, is a transverse way 3, whereon is slidably fitted a carriage 4, said carriage being adjustable by a screw spindle 5 rotatable in the base and threading through a nut 6 on the carriage, this spindle having a wheel 7 on its outer end for manual operation.

A spindle 8 is journaled in bearings 9 on the carriage 4, lying parallel with the direction of adjustment movement of the carriage on its guide. A pulley 10 on this spindle provides for reception of power to drive the spindle, and thereby a set of circular saws 11 which are clamped on the forward end of the spindle by a nut 12. Spacers 13 between the blades separate the blades by equal distances, corresponding to the thickness of the button blanks to be cut. By substituting spacers of somewhat greater or less thickness any desired thickness of blanks may be obtained.

An adjusting nut 14 on the rear end of the spindle 8 provides for the taking up of wear.

The cutting head formed by the set of saws on the front end of the spindle is enclosed by a housing formed by a cap-like cover 15 applied to a fixed disc 16 on the front of the frame of the carriage 4. This housing has an oblong entrance 17 at one side, opposite the edges of the saws; and above this entrance the housing is provided with a liquid chamber 18 communicating with the interior of the housing by a transverse slit-opening 19 arranged to direct liquid downward onto the saw-blades. Water or other liquid is supplied by a pump 20 driven by the aid of a pulley 21, the pump being connected with a suitable source by a conduit 22, and with the water-chamber by a conduit 23. The water, which keeps the saw-blades from overheating, together with the shell refuse, pass out through a hole 24 in the bottom of the housing, and may be received by a basin 25 formed in the base, whence the waste water and refuse may be carried off by a pipe 26.

The base frame has an upstanding portion 27, on which is an elongated boxed guide-way 28, having a removable cover 29. This guide-way is in line with the entrance 17, and receives two slide-bars 30, 31, lying face to face, one above the other. These bars form holders for jaws 32, 33 of a chuck or work-holder for the core to be divided. The jaws are secured to the forward ends of the bars by screws 34, and one of the jaws, preferably the upper jaw has a substantially semi-circular concavity, while the forward half of the lower jaw is omitted. The parts of the chuck are capable of sliding or moving lengthwise relatively to each other, and the plane of the relative movement or cleavage between the jaws bisects the work-receiving socket formed by the complimental jaws. In other words, the line of relative movement is parallel with the chord or base of the concavity of the jaw 32. When the jaws are in register, the socket formed by the two jaws embraces approximately three-quarters of the circumference of a core between them, which is consequently held. When the short jaw 33 is retracted relatively to the long jaw, the cut blanks are released, and a fresh core can be introduced, to be held as soon as the short jaw is advanced again.

The parts of the chuck carrying a core are advanced together to carry the core through the entrance 17 into the field of the saws 11, are then withdrawn together, carrying the cut blanks, and then the parts of the chuck are caused to move relatively to each other to release the blanks and receive a fresh core. The jaws are slotted as shown at 35 in a comb-like manner to pass between the saw-blades. If the spacing of the blades should be changed, the jaws may be changed for others differently slotted. The adjustment of the carriage 4 enables the saw-blades at all times to be alined with the slots in the jaws.

The bars 30, 31 are connected by a spring 36 accommodated in recesses 37 in the bars and hooked at its opposite ends about pins in these recesses. The action of this spring is to bring the jaws into holding relation. The bar 31 has a rearward extension 38 for the connection of a hand lever 39, which is shown slidably fulcrumed in a pivot stud 40 on the frame and connected to the bar by a block 41 and pivot 42. An adjustable screw 43 in the block contacts with a surface 45 of the fixed frame to limit the forward movement of the chuck. A pin 46 on the bar 31 limits the rearward movement of the bar 31 by contacting with a fixed stop 47 screwed to the rear end of the guide 28.

Before, however, the projection 46 on the bar 31 reaches the stop 47, the rear end of the bar 30 has already encountered the stop. Consequently the rearward movement of the bar 30 was then arrested, while the rearward movement of the bar 31 continued for a short distance farther, the spring 36 permitting the relative movement. This causes the opening of the jaws, as seen in Fig. 4. In the first part of the next forward movement produced by the lever, the bar 31 advances, while the bar 30 remains stationary, held against the stop 47 by the spring 36. When the jaws are in register again, gripping a core, the two parts of the chuck are advanced together.

While the device has been described in detail, in order that a clear understanding may be had, it will be understood that the invention is not limited to the precise form and details, and that various changes may be made without departing from essentials. The invention is particularly designed for and useful in the button industry, but it may be applied to the cutting of other materials than mother-of-pearl or in other industries.

What is claimed as new is:

1. A machine for cutting cores of shell stock into equal button blanks, comprising a stationarily supported rotary spindle, a cutting head comprising a number of saws secured in spaced relation on said spindle, a reciprocatory two-part chuck having slotted jaws to hold the core, and single manually operated lever means for advancing and retracting said chuck and producing relative movement between its parts to cause opening and closing of the jaws.

2. In a machine of the character described, a chuck comprising two slidable parts carrying complemental jaws, a spring between said parts acting to bring the jaws into holding relation, means arranged to act upon one of said parts to advance and withdraw both parts, and a stop arranged to arrest the withdrawal movement of the other part so that further withdrawal movement of the first part separates the jaws.

3. The herein described chuck means, comprising a frame containing a slide-way, two slide bars face to face in said slide-way, complemental jaws on the forward end of said bars, said bars having a chamber formed between them, a spring in said chamber resiliently connecting the two bars, a lever arranged to act upon one of said slide bars to advance and withdraw both bars, and a stop arranged to arrest the withdrawal movement of the other bar so that further withdrawal movement of the first bar separates the jaws.

JOHN R. KUZMA.
ANDREW OSTROCHOVSKY.